United States Patent
Bajpai (10) Patent No.: US 9,764,744 B2
(45) Date of Patent: Sep. 19, 2017

(54) VEHICLE YAW RATE ESTIMATION SYSTEM

(71) Applicant: MAGNA ELECTRONICS INC., Auburn Hills, MI (US)

(72) Inventor: Devendra Bajpai, Bloomfield Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/051,825

(22) Filed: Feb. 24, 2016

(65) Prior Publication Data

US 2016/0244069 A1 Aug. 25, 2016

Related U.S. Application Data

(60) Provisional application No. 62/120,574, filed on Feb. 25, 2015.

(51) Int. Cl.
 *B60W 40/114* (2012.01)
(52) U.S. Cl.
 CPC ..... *B60W 40/114* (2013.01); *B60W 2520/125* (2013.01); *B60W 2520/28* (2013.01); *B60W 2540/18* (2013.01)
(58) Field of Classification Search
 CPC ........... B60W 40/114; B60W 2520/18; B60W 2520/28; B60W 2520/25
 See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,796,094 A | 8/1998 | Schofield et al. |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |

(Continued)

*Primary Examiner* — Aaron L Troost
(74) *Attorney, Agent, or Firm* — Gardner, Linn, Burkhart & Flory, LLP (57) ABSTRACT

A yaw rate estimation system for a vehicle includes a control receiving inputs indicative of (i) a first yaw rate determined by a yaw rate sensor of the vehicle, (ii) a second yaw rate derived from ABS wheel sensors of the vehicle, (iii) a third yaw rate derived from a lateral acceleration of the vehicle and (iv) a fourth yaw rate derived from a steering wheel angle, wheel angle and rate of change of steering wheel angle. The control is operable to process the inputs to estimate the yaw rate of the vehicle, with the estimated yaw rate derived from the inputs.

20 Claims, 8 Drawing Sheets

(56) References Cited

U.S. PATENT DOCUMENTS

| | | |
|---|---|---|
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 6,097,024 A | 8/2000 | Stam et al. |
| 6,144,022 A | 11/2000 | Tenenbaum et al. |
| 6,175,300 B1 | 1/2001 | Kendrick |
| 6,178,034 B1 | 1/2001 | Allemand et al. |
| 6,198,409 B1 | 3/2001 | Schofield et al. |
| 6,223,114 B1 | 4/2001 | Boros et al. |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |
| 6,370,329 B1 | 4/2002 | Teuchert |
| 6,392,315 B1 | 5/2002 | Jones et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,672,731 B2 | 1/2004 | Schnell et al. |
| 6,678,614 B2 | 1/2004 | McCarthy et al. |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,711,474 B1 | 3/2004 | Treyz et al. |
| 6,714,331 B2 | 3/2004 | Lewis et al. |
| 6,735,506 B2 | 5/2004 | Breed et al. |
| 6,744,353 B2 | 6/2004 | Sjönell |
| 6,762,867 B2 | 7/2004 | Lippert et al. |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,889,161 B2 | 5/2005 | Winner et al. |
| 6,909,753 B2 | 6/2005 | Meehan et al. |
| 6,975,775 B2 | 12/2005 | Rykowski et al. |
| 6,989,736 B2 | 1/2006 | Berberich et al. |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,167,796 B2 | 1/2007 | Taylor et al. |
| 7,195,381 B2 | 3/2007 | Lynam et al. |
| 7,202,776 B2 | 4/2007 | Breed |
| 7,227,611 B2 | 6/2007 | Hull et al. |
| 7,460,951 B2 | 12/2008 | Altan |
| 7,480,149 B2 | 1/2009 | DeWard et al. |
| 7,490,007 B2 | 2/2009 | Taylor et al. |
| 7,581,859 B2 | 9/2009 | Lynam |
| 7,592,928 B2 | 9/2009 | Chinomi et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,881,496 B2 | 2/2011 | Camilleri et al. |
| 8,027,029 B2 | 9/2011 | Lu et al. |
| 8,058,977 B2 | 11/2011 | Lynam |
| 8,340,866 B2 | 12/2012 | Hanzawa et al. |
| 8,694,224 B2 * | 4/2014 | Chundrlik, Jr. ... B60W 50/0098 180/233 |
| 2002/0015153 A1 | 2/2002 | Downs |
| 2002/0113873 A1 | 8/2002 | Williams |
| 2003/0137586 A1 | 7/2003 | Lewellen |
| 2003/0156015 A1 | 8/2003 | Winner et al. |
| 2003/0222982 A1 | 12/2003 | Hamdan et al. |
| 2004/0114381 A1 | 6/2004 | Salmeen et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0250501 A1 | 11/2006 | Widmann et al. |
| 2006/0290479 A1 | 12/2006 | Akatsuka et al. |
| 2007/0104476 A1 | 5/2007 | Yasutomi et al. |
| 2008/0189013 A1 * | 8/2008 | Iwazaki ................ B60T 8/172 701/41 |
| 2009/0113509 A1 | 4/2009 | Tseng et al. |
| 2009/0177347 A1 | 7/2009 | Breuer et al. |
| 2009/0244361 A1 | 10/2009 | Gebauer et al. |
| 2010/0228437 A1 | 9/2010 | Hanzawa et al. |
| 2012/0245817 A1 | 9/2012 | Cooprider et al. |
| 2013/0124052 A1 | 5/2013 | Hahne |
| 2014/0350834 A1 | 11/2014 | Turk |
| 2015/0291215 A1 | 10/2015 | Bajpai et al. |

* cited by examiner

Estimation Block

FIG. 6

Variance of the signals.

FIG. 7

Offset Correction

FIG. 8

Results – 2: Yaw Rate Estimation Output

VEHICLE YAW RATE ESTIMATION SYSTEM

CROSS REFERENCE TO RELATED APPLICATION

The present application claims the filing benefits of U.S. provisional application Ser. No. 62/120,574, filed Feb. 25, 2015, which is hereby incorporated herein by reference in its entirety.

FIELD OF THE INVENTION

The present invention relates generally to a yaw rate determination system for a vehicle.

BACKGROUND OF THE INVENTION

Sensing yaw rate is important to land-based vehicles, and specifically, to road-going vehicles. Vehicle systems, such as collision avoidance systems, collision mitigation systems and stability control systems, may require accurate values of yaw rate to correctly determine the projected path of vehicle travel. Yaw rate sensors are susceptible to error, and if the measured yaw rate has significant error, then these kinds of vehicle systems may perform poorly or even fail.

SUMMARY OF THE INVENTION

The present invention provides a yaw rate estimation system that is operable to compute or determine an estimated yaw rate using additional vehicle signals and vehicle kinematics to compute the estimated yaw rate (and the system does this without using a forward facing or viewing camera or imager). Because the forward viewing camera is a recipient of the estimated yaw rate, known forward viewing camera yaw rate methods are dependent on this estimation, and thus cannot be used for this estimation. The system of the present invention processes multiple yaw rates derived from different vehicle systems and a yaw rate sensor to determine an estimated yaw rate of the vehicle.

These and other objects, advantages, purposes and features of the present invention will become apparent upon review of the following specification in conjunction with the drawings.

DESCRIPTION OF THE PREFERRED EMBODIMENTS

Figure 1:
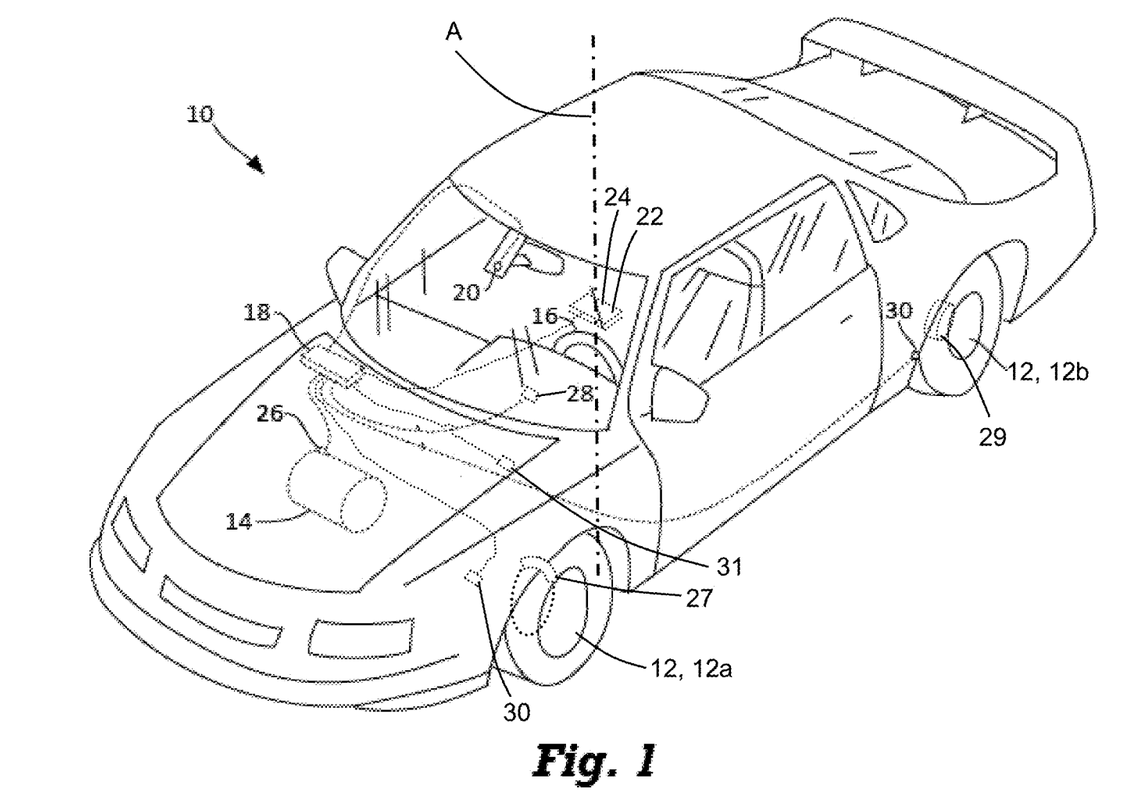
FIG. 1 is a plan view of a vehicle with a vision system that incorporates cameras in accordance with the present invention.

Referring now to the drawings and the illustrative embodiments depicted therein, FIG. 1 illustrates a vehicle 10 equipped with the system of the present invention. In this example, the vehicle 10 is a passenger car, but in other examples, the vehicle may be a truck, bus, van, motorcycle, or any other kind of vehicle. In the illustrated embodiment, the equipped vehicle 10 includes a body, a passenger area, wheels 12 (including front wheels 12a and rear wheels 12b), an internal combustion engine and/or an electric motor to drive the vehicle 10, a transmission 14 to convey power from the engine or motor to the wheels 12, a steering wheel 16 to turn the front wheels 12a, as well as other components for powering and controlling the vehicle 10. Clearly, the equipped vehicle may have other systems or components, such as, for example, steering of the rear wheels 12b or the like, without affecting the scope of the present invention.

As shown in FIG. 1, the vehicle 10 further includes a control system 18, a camera 20, a yaw rate sensor 22, a longitudinal accelerometer 24, a transmission sensor 26, a steering angle sensor 28, a speed sensor 30 and a brake sensor 31. The camera 20, yaw rate sensor 22, longitudinal accelerometer 24, transmission sensor 26, steering angle sensor 28, and speed sensor 30 are each connected to the control system 18 to provide sensed information to the control system 18. Such connections may be by way of conductive wires or wireless signals. A bus, such as a Controller-Area Network (CAN) bus or a Local Interconnect Network (LIN) bus or the like, may be used for communication between the sensors and the control system 18. The system may utilize aspects of the systems described in U.S. Pat. No. 8,694,224, which is hereby incorporated herein by reference in its entirety.

The yaw rate sensor 22 is operable to sense the left and right yaw rate of the vehicle 10 (in other words, to sense the positive and negative angular rotational velocity of the vehicle about a local vertical axis A of the vehicle). Output of the yaw rate sensor 22 to the control system 18 may comprise a voltage within a range of voltages, or a data message sent over a communications bus or network bus of the vehicle, such as a CAN bus or the like. The yaw rate sensor 22 may include any type of device, such as piezoelectric device, a micromechanical device, a microelectromechanical device, or similar. The longitudinal accelerometer 24 is operable to sense the longitudinal (forward or reverse) acceleration of the vehicle 10 and provide a signal indicative of a magnitude of such acceleration to the control system 18. The longitudinal accelerometer 24 may include any type of device, such as piezoelectric device, a micromechanical device, a microelectromechanical device, or similar. The longitudinal accelerometer 24 may be part of a multi-axis accelerometer.

The system of the present invention provides yaw rate estimation using vehicle signals and statistical analysis techniques. The system provides yaw rate offset correction and noise filtering, and provides robust yaw rate estimation using vehicle signals. The system of the present invention thus improves the resolution of the yaw rate signal and provides fault tolerant yaw rate signals with better quality. Because the signals from individual yaw rate sensors may have poor resolution and offsets, the resolutions and offsets may be out of tolerance for lane keeping features and forward viewing camera applications. The present invention uses multiple yaw rate signals to provide an enhanced estimate of the yaw rate.

The vehicle signals used may include:

Wheel speeds for all four wheels (Vfl, Vrl, Vfr, Vrr).
Wheel radius and wheel speeds for all four wheels.
Yaw Rate Raw from the Yaw Rate Sensor.
Yaw Rate Offset from the Yaw Rate Sensor.
Lateral Acceleration.
Yaw Rate Temperature from the Yaw Rate Sensor.
Steering wheel angle, steering wheel rate of change, steering ratio for the entire speed range.
Wheel angle.
Vehicle stationary, engine running flags.
Vehicle driving straight flags.
Vehicle velocity.

The yaw rates may be estimated from the following equations, where YawRate_1 is the yaw rate from the yaw rate sensor and YawRate_2 is the yaw rate derived from the wheel sensors (such as anti-lock braking system (ABS) wheel sensors) and YawRate_3 is the yaw rate derived from the lateral acceleration of the vehicle and YawRate_4 is derived from the steering wheel angle, wheel angle and the rate of change of steering wheel angle.

$$YawRate2: y_{r2} = \frac{Vx}{R}$$

$$YawRate3: y_{r3} = \frac{Vx^2}{R}$$

Computation of radius of curvature R:

$$\frac{1}{R} = \frac{2}{L}\left(\frac{\frac{V_{rl}}{V_{rr}} - 1}{\frac{V_{rl}}{V_{rr}} + 1}\right),$$

$$V_x = \frac{\omega_{rl} + \omega_{rr}}{2}r$$

where $V_{fl}$, $V_{fr}$, . . . , $V_{rr}$ wheel velocity m/s for four wheels, and, $w_{fl}$, $w_{fr}$, . . . , $w_{rr}$ wheel rotation. $V_x$=longitudinal velocity, r=radius nominal rear wheel The yaw rate data analysis provides a "vehicle state" that is a function of the yaw rate, the SWA, SWA_Rate, the lateral acceleration and wheel velocity.

The system uses signal conditioning, with a sampling frequency of about 100 Hz and a desired cut off frequency of about 0.5 Hz to about 2 Hz or thereabouts. The system uses two filters:

The Long Time Period Filter (60-180) sec.=[0.0167-0.005] Hz i) Compute Offset At Standstill (Velocity=0);
ii) Compute Offset when driving straight (Steering Angle~=0) (Steering Rate of Change~=0);
iii) Compute Variance of noise;
iv) Estimate the offset using a PID controller; and
v) Define weights on the estimate from (i) and (ii).

The Short Time IIR filter is around 2.0 Hz.

The system calculates offset estimates using weights and statistics.

Figure 2:
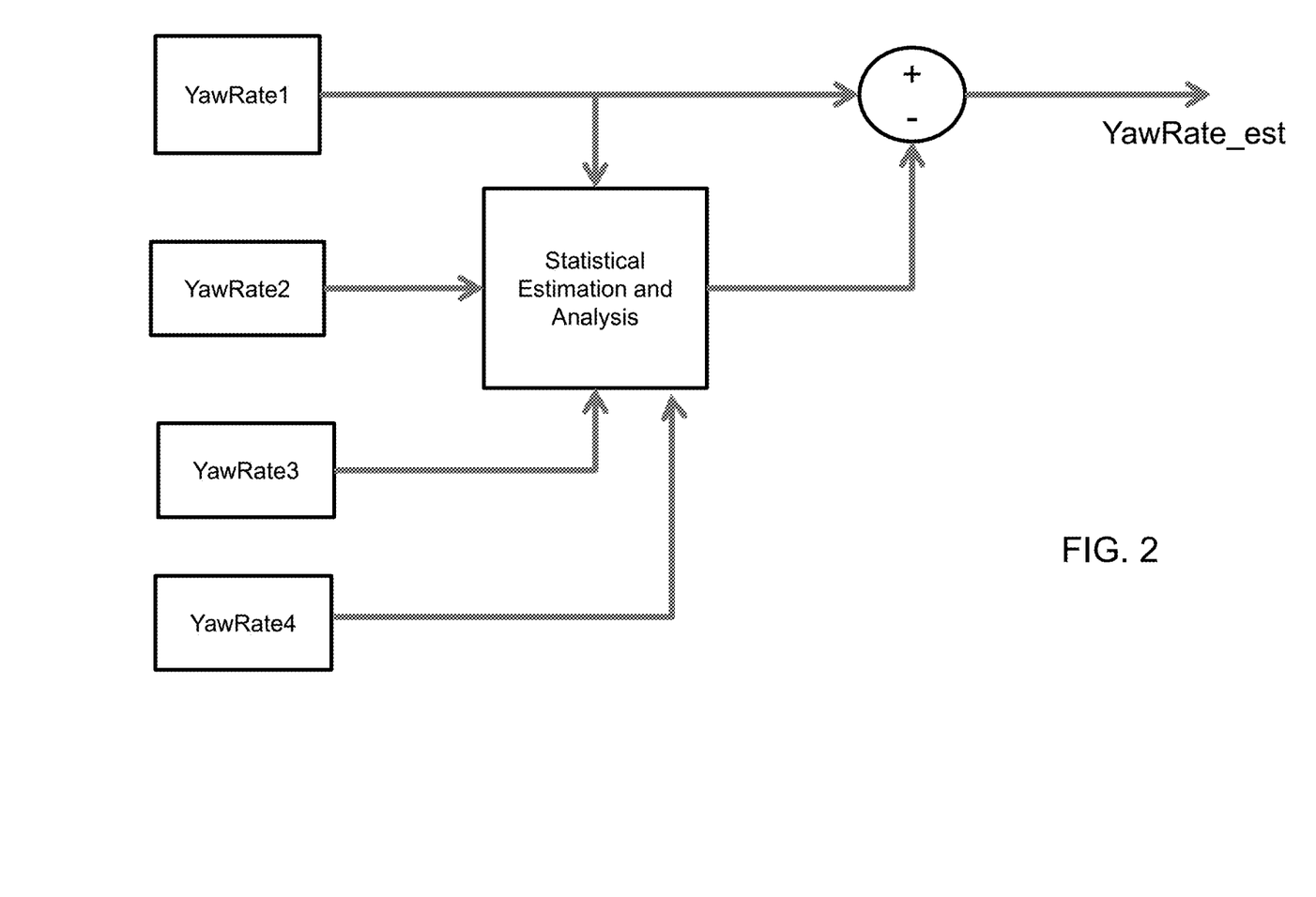
FIG. 2 is a block diagram showing processing of the yaw rate inputs to estimate the yaw rate in accordance with the present invention.
Figure 3:
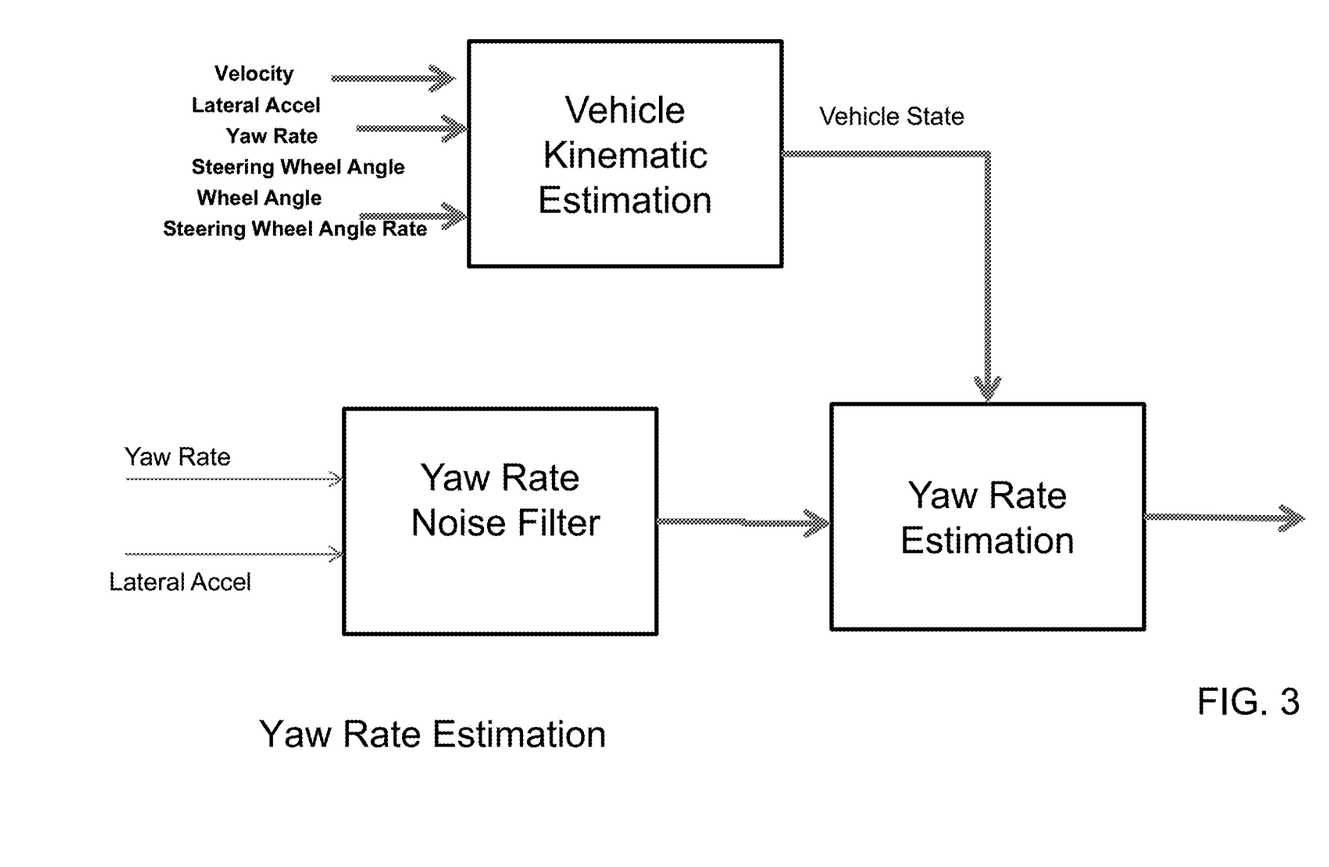
FIG. 3 is a block diagram showing the yaw rate estimation of the present invention, using vehicle kinematic estimations and yaw rate noise filters.
Figure 4:
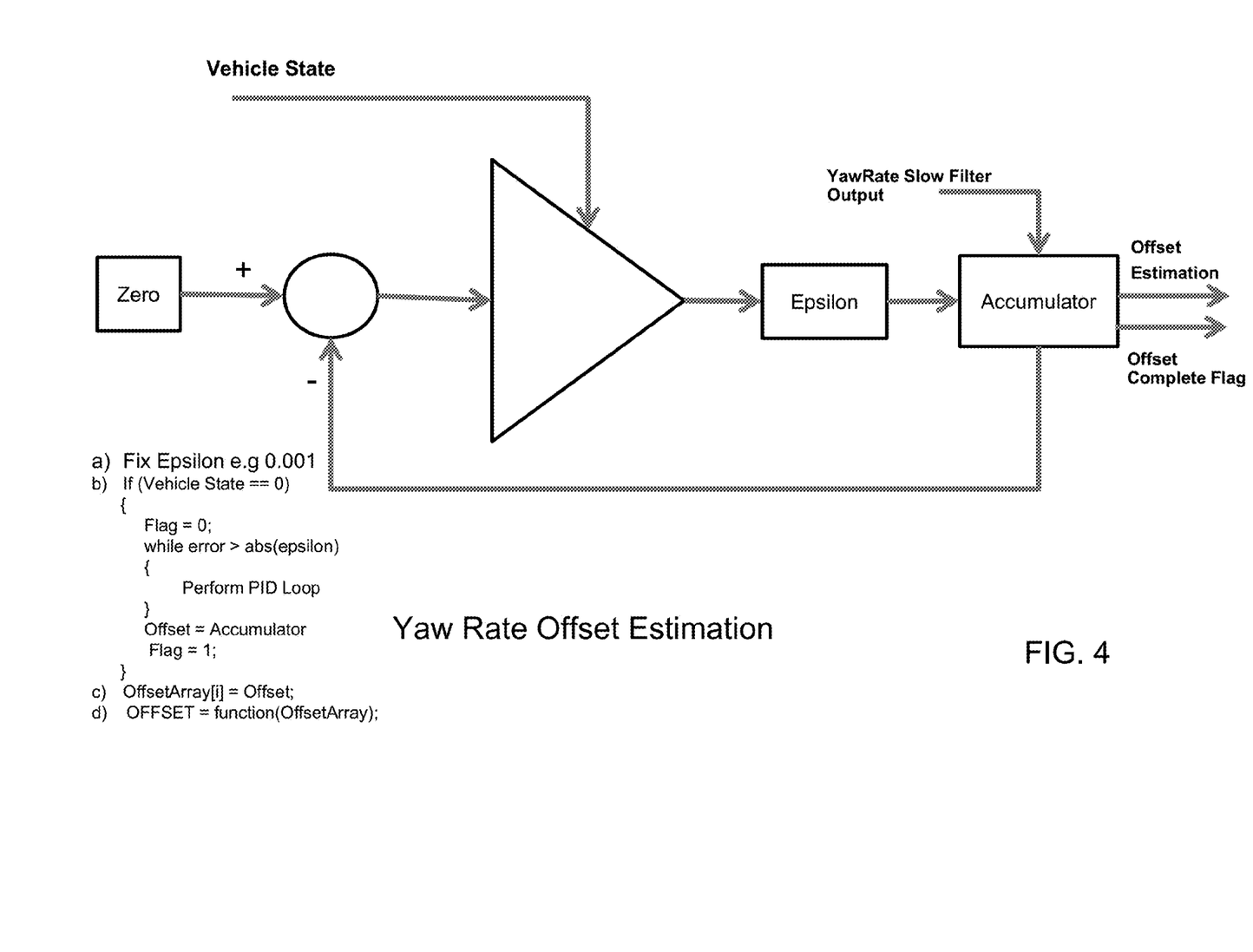
FIG. 4 is a block diagram of estimation of the yaw rate offset in accordance with the present invention.
Figure 5:
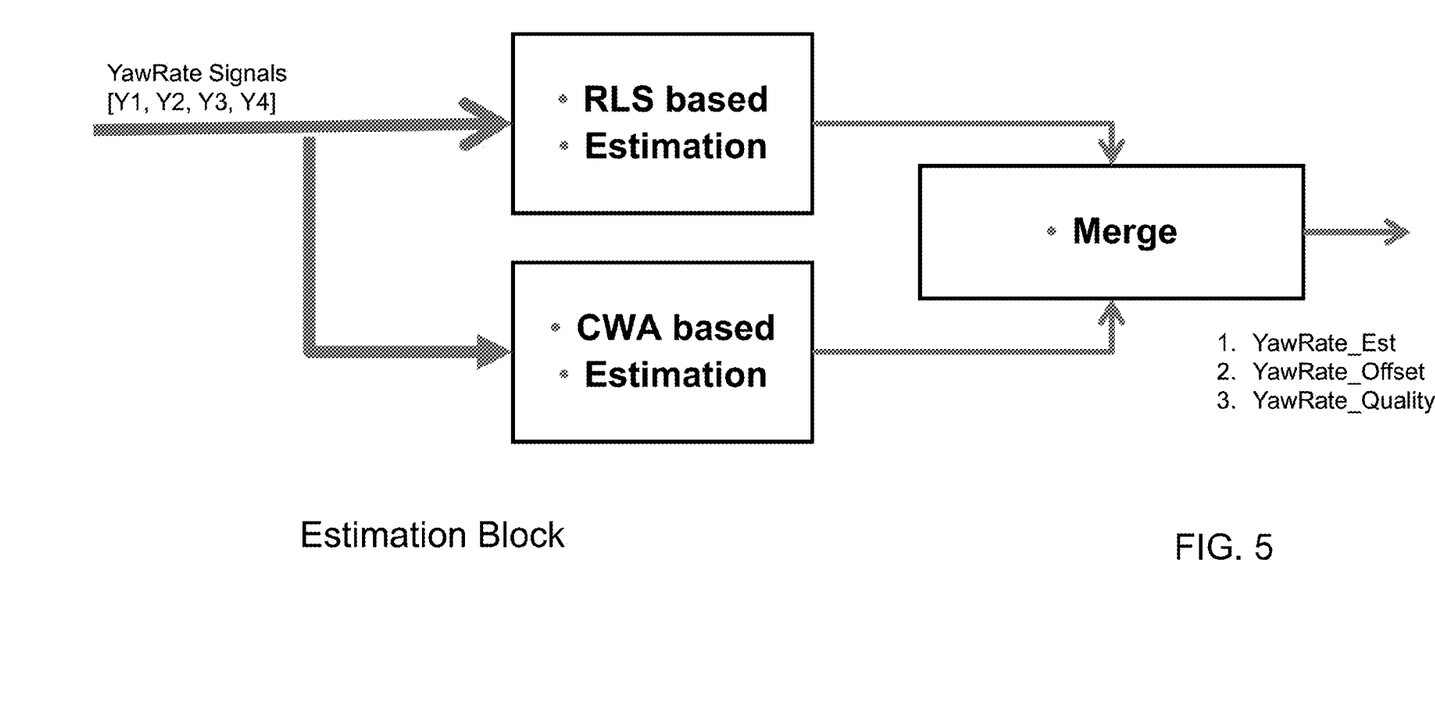
FIG. 5 is a block diagram of estimation of the yaw rate, the yaw rate offset and the yaw rate quality in accordance with the present invention.
Figure 6:
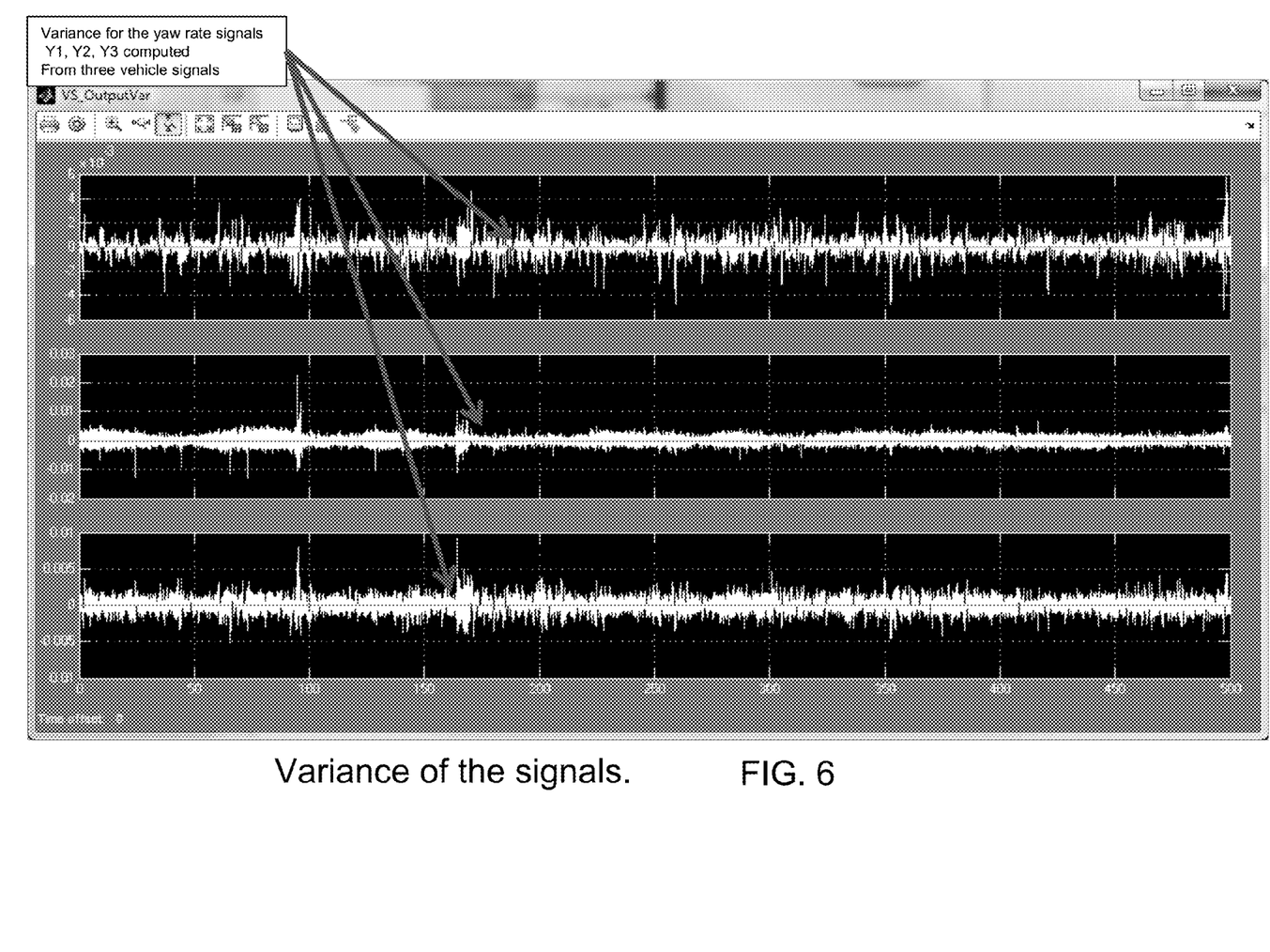
FIG. 6 shows graphs of the variance for the yaw rate signals derived from three vehicle signals.
Figure 7:
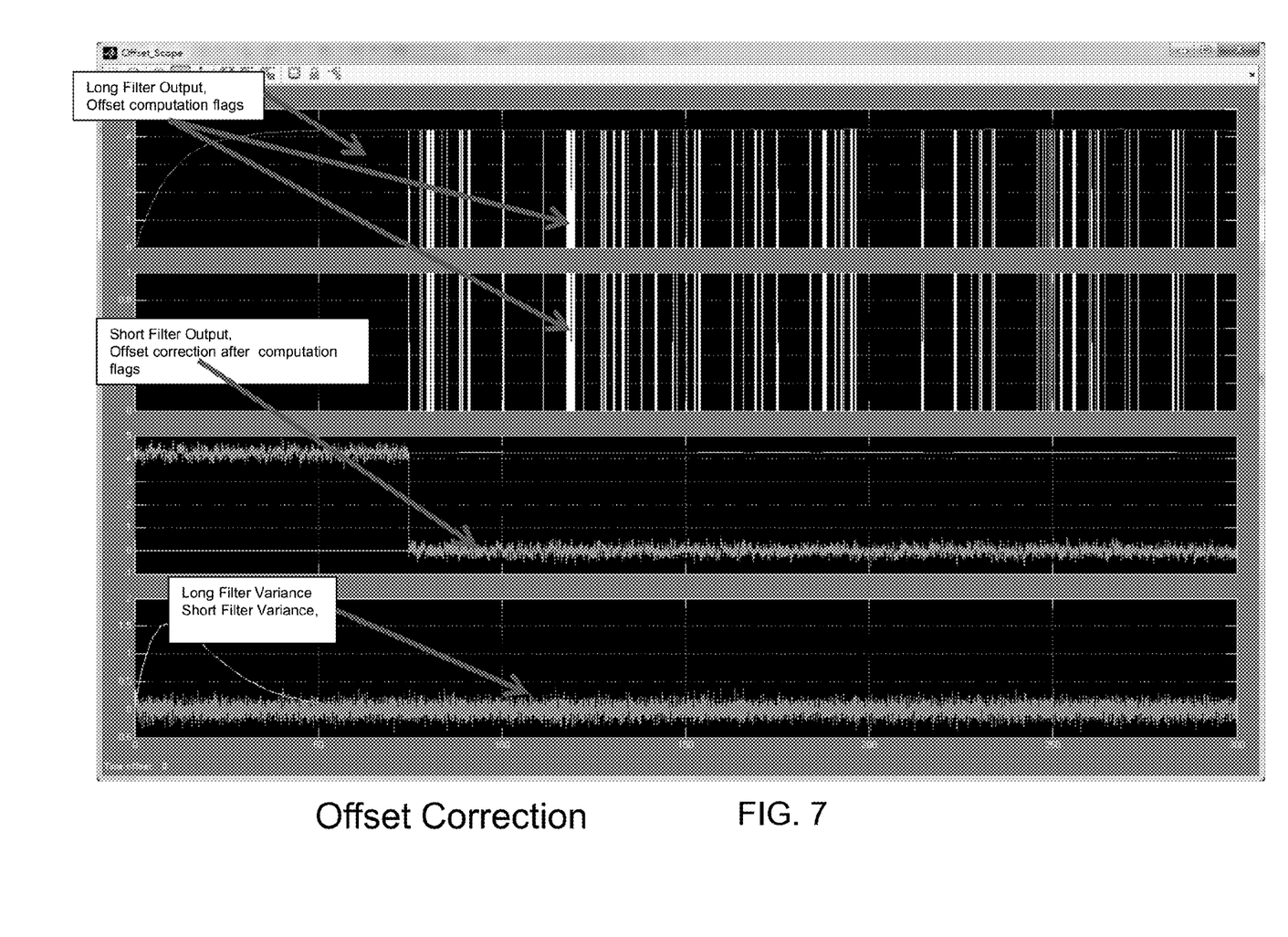
FIG. 7 shows graphs showing the offset correction.
Figure 8:
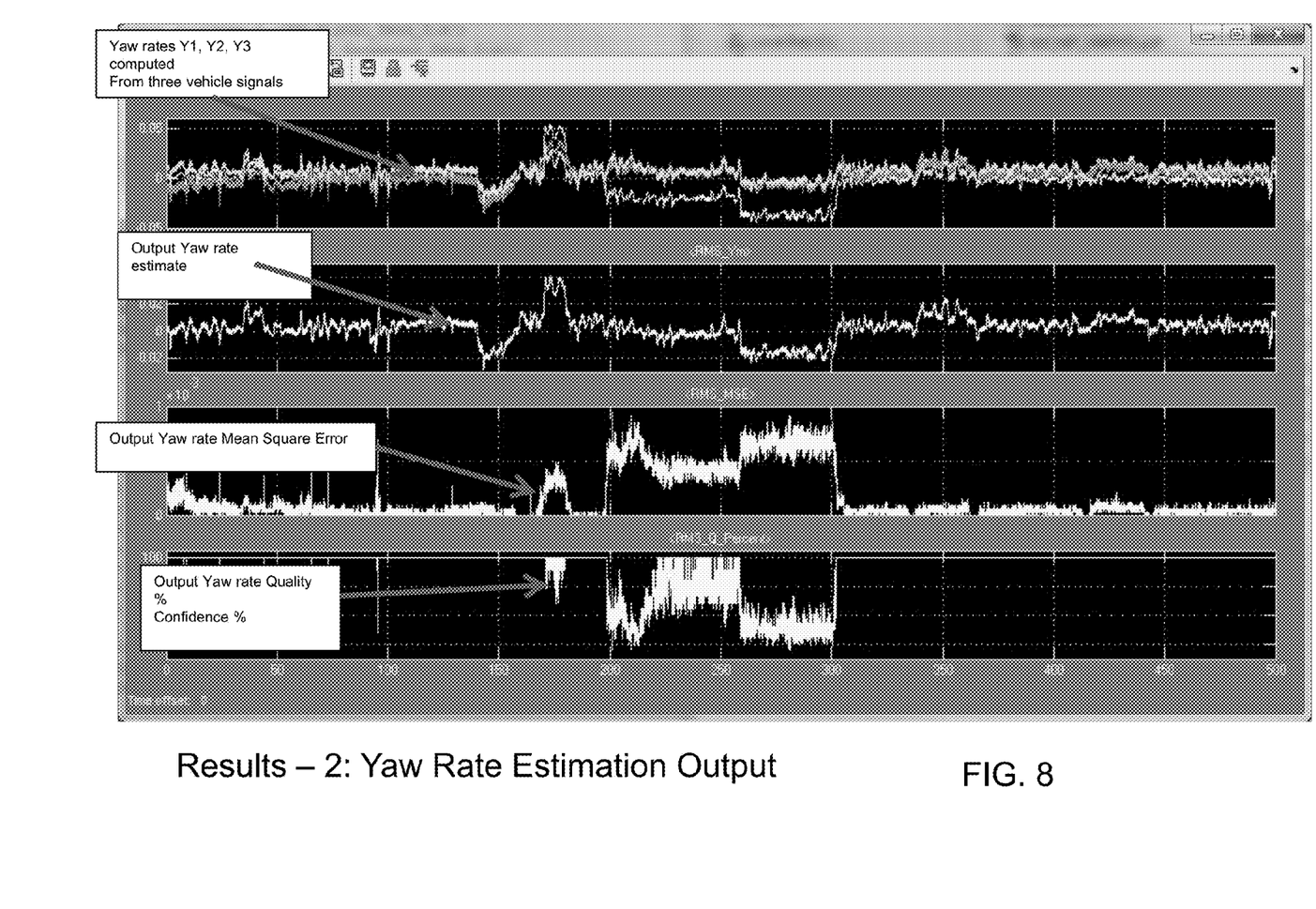
FIG. 8 shows graphs of the yaw rate estimation outputs.

As shown in FIG. 2, the system processes the four yaw rates via statistical estimation and analysis to determine the estimated yaw rate. The system may use adaptive offset estimation using Recursive Least Squares (RLS), confidence weighted average combined with Recursive Least Squares. FIGS. 3-5 show the yaw rate estimation process, the yaw rate offset estimation process and the estimation block in accordance with the present invention. FIGS. 6-8 are graphs showing the variance of the yaw rate signals (FIG. 6), the offset correction (FIG. 7) and the yaw rate estimation output (FIG. 8).

The system may provide additional outputs, such as, for example, a driving state: stable flag or output, a vehicle stationary engine running output, a vehicle driving straight and level output, a detection of sensor faults, such as a residual error (MSE) based confidence measure.

The system of the present invention may utilize aspects of the systems described in U.S. Pat. No. 8,694,224 and/or U.S. Publication Nos. US-2015-0291215 and/or US-2014-0350834, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A yaw rate estimation system for a vehicle, said yaw rate estimation system comprising:
   a yaw rate sensor disposed at a vehicle equipped with said yaw rate estimation system;
   wheel sensors disposed at wheels of the equipped vehicle;
   an acceleration sensor disposed at the equipped vehicle and operable to determine lateral acceleration of the equipped vehicle;
   a steering wheel angle sensor disposed at the equipped vehicle and operable to determine an angle of a steering wheel of the equipped vehicle;
   a control system disposed at the equipped vehicle and receiving inputs indicative of (i) a first yaw rate determined by said yaw rate sensor of the equipped vehicle, (ii) a second yaw rate derived from said wheel sensors of the equipped vehicle, (iii) a third yaw rate derived from a lateral acceleration of the equipped vehicle as determined by said acceleration sensor, and (iv) a fourth yaw rate derived from a steering wheel angle, wheel angle and rate of change of steering wheel angle as determined by said steering wheel angle sensor; and
   wherein said control system processes said inputs to estimate the actual yaw rate of the equipped vehicle, and wherein the estimated actual yaw rate is derived from said inputs.

2. The yaw rate estimation system of claim 1, wherein said control system processes said inputs to estimate the actual yaw rate of the equipped vehicle without use of image data captured by a forward viewing camera.

3. The yaw rate estimation system of claim 1, wherein said control system is operable to estimate the actual yaw rate of the equipped vehicle using statistical estimation and analysis of said first, second, third and fourth yaw rates.

4. The yaw rate estimation system of claim 3, wherein said control system is operable to provide an adaptive offset estimation using Recursive Least Squares and Confidence Weighted Average combined with Recursive Least Squares.

5. The yaw rate estimation system of claim 1, wherein said wheel sensors comprise wheel sensors of an anti-lock brake system of the equipped vehicle, and wherein said second yaw rate is derived from said anti-lock brake system wheel sensors of the equipped vehicle.

6. The yaw rate estimation system of claim 1, wherein said yaw rate sensor is operable to sense the left and right yaw rate of the equipped vehicle.

7. The yaw rate estimation system of claim 1, wherein said yaw rate sensor is operable to sense positive and negative angular rotational velocity of the equipped vehicle about a local vertical axis of the equipped vehicle.

8. The yaw rate estimation system of claim 1, wherein output of said yaw rate sensor is communicated to said control system via a communication bus of the equipped vehicle.

9. The yaw rate estimation system of claim 1, wherein said control system, responsive to estimation of the actual yaw rate, provides yaw rate offset correction to correct said first yaw rate.

10. The yaw rate estimation system of claim 1, wherein said control system, responsive to estimation of the actual yaw rate, provides noise filtering for said input from said yaw rate sensor.

11. A yaw rate estimation system for a vehicle, said yaw rate estimation system comprising:
- a yaw rate sensor disposed at a vehicle equipped with said yaw rate estimation system;
- wheel sensors disposed at wheels of the equipped vehicle;
- an acceleration sensor disposed at the equipped vehicle and operable to determine lateral acceleration of the equipped vehicle;
- a steering wheel angle sensor disposed at the equipped vehicle and operable to determine an angle of a steering wheel of the equipped vehicle;
- a control system disposed at the equipped vehicle and receiving inputs indicative of a first yaw rate determined by said yaw rate sensor of the equipped vehicle and receiving inputs indicative of at least two of (i) a second yaw rate derived from said wheel sensors of the equipped vehicle, (ii) a third yaw rate derived from a lateral acceleration of the equipped vehicle as determined by said acceleration sensor and (iii) a fourth yaw rate derived from a steering wheel angle, wheel angle and rate of change of steering wheel angle as determined by said steering wheel angle sensor; and
- wherein said control system processes said inputs to estimate the actual yaw rate of the equipped vehicle, and wherein the estimated actual yaw rate is derived from said inputs.

12. The yaw rate estimation system of claim 11, wherein said control system processes said inputs to estimate the actual yaw rate of the equipped vehicle without use of image data captured by a forward viewing camera.

13. The yaw rate estimation system of claim 11, wherein said control system is operable to estimate the actual yaw rate of the equipped vehicle using statistical estimation and analysis of said first yaw rate and said at least two of said second, third and fourth yaw rates.

14. The yaw rate estimation system of claim 11, wherein output of said yaw rate sensor is communicated to said control system via a communication bus of the equipped vehicle.

15. The yaw rate estimation system of claim 11, wherein said control system, responsive to estimation of the actual yaw rate, provides yaw rate offset correction to correct said first yaw rate.

16. The yaw rate estimation system of claim 11, wherein said control system, responsive to estimation of the actual yaw rate, provides noise filtering for said input from said yaw rate sensor.

17. The yaw rate estimation system of claim 11, wherein said control system, responsive to estimation of the actual yaw rate, provides enhanced resolution of said input indicative of said first yaw rate.

18. A yaw rate estimation system for a vehicle, said yaw rate estimation system comprising:
- a yaw rate sensor disposed at a vehicle equipped with said yaw rate estimation system;
- wheel sensors disposed at wheels of the equipped vehicle;
- an acceleration sensor disposed at the equipped vehicle and operable to determine lateral acceleration of the equipped vehicle;
- a steering wheel angle sensor disposed at the equipped vehicle and operable to determine an angle of a steering wheel of the equipped vehicle;
- a control system disposed at the equipped vehicle and receiving inputs indicative of (i) a first yaw rate determined by said yaw rate sensor of the equipped vehicle, (ii) a second yaw rate derived from said wheel sensors of the equipped vehicle, (iii) a third yaw rate derived from a lateral acceleration of the equipped vehicle as determined by said acceleration sensor and (iv) a fourth yaw rate derived from a steering wheel angle, wheel angle and rate of change of steering wheel angle as determined by said steering wheel angle sensor;
- wherein said control system receives at least some of said inputs via a communication bus of the equipped vehicle;
- wherein said control system processes said inputs to estimate the actual yaw rate of the equipped vehicle, and wherein the estimated actual yaw rate is derived from said inputs; and
- wherein said control system is operable to estimate the actual yaw rate of the equipped vehicle using statistical estimation and analysis of said inputs indicative of said first, second, third and fourth yaw rates.

19. The yaw rate estimation system of claim 18, wherein said control system processes said inputs to estimate the actual yaw rate of the equipped vehicle without use of image data captured by a forward viewing camera.

20. The yaw rate estimation system of claim 18, wherein said control system, responsive to estimation of the actual yaw rate, provides at least one of (i) yaw rate offset correction to correct said first yaw rate, (ii) noise filtering for said input from said yaw rate sensor and (iii) enhanced resolution of said input indicative of said first yaw rate.

* * * * *